United States Patent [19]

Desplanches et al.

[11] 4,064,209
[45] Dec. 20, 1977

[54] METHOD OF CONNECTING AN ALKALINE BETA ALUMINA PART TO AN ALPHA ALUMINA PART

[75] Inventors: Gérard Desplanches, Villejust; Yvon Lazennec, Saint Michel sur Orge; Jacques Leboucq, Sainte Genevieve des Bois, all of France

[73] Assignee: Compagnie Generale d'Electricite S.A., Paris Cedex, France

[21] Appl. No.: 701,931

[22] Filed: July 1, 1976

[30] Foreign Application Priority Data

July 25, 1975 France ................ 75.23315

[51] Int. Cl.² .............................................. C03C 27/00
[52] U.S. Cl. .......................................... 264/61; 65/43; 65/155; 264/65; 264/66
[58] Field of Search .............. 65/36, 43, 155; 264/61, 264/65, 66; 429/104; 106/65

[56] References Cited

U.S. PATENT DOCUMENTS

| | | |
|---|---|---|
| 3,607,435 | 9/1971 | Charles et al. ............... 106/65 X |
| 3,875,277 | 4/1975 | Bratton et al. ............... 106/65 X |
| 3,903,225 | 9/1975 | Jones ............................. 106/65 X |
| 3,950,463 | 4/1976 | Jones ............................. 264/66 |

FOREIGN PATENT DOCUMENTS 2,407,926  8/1974  Germany ................ 429/104

*Primary Examiner*—Richard V. Fisher
*Attorney, Agent, or Firm*—Sughrue, Rothwell, Mion, Zinn and Macpeak

[57] ABSTRACT

The alpha alumina part is heated to between 1400° C and 1600° C for 10 to 20 hours in a mass of alkaline carbonate or aluminate. It is then disposed in contact with a blank of the alkaline beta alumina part in a sintering enclosure suitable for establishing an atmosphere which is rich in alkaline metal and in heating this enclosure to between 1600° C and 1700° C for between 30 minutes and 4 hours, so as to sinter the alkaline beta alumina part while effecting the connection thereof to the alpha alumina part. The invention is used in manufacturing sodium-sulphur type electric cells.

9 Claims, 6 Drawing Figures

METHOD OF CONNECTING AN ALKALINE BETA ALUMINA PART TO AN ALPHA ALUMINA PART

BACKGROUND OF THE INVENTION

1. Field Of The Invention

The invention relates to a method of connecting alkaline beta alumina parts to alpha parts and all incorporating such a connection. Such a connection is practically impregnable to attack by liquid metals such as sodium.

2. Description Of The Prior Art

Such a method is consequently advantageously used in sodium alumina electrolyte part and a support made generally of alpha alumina.

It has been proposed, moreover, to form such a connection by means of glass parts and more particularly borosilicate glass parts, which provide sealed connections having great resistance to corrosion.

However, in the case where electric cells are to be used for long period electric power storage, which can last for several decades, there is nevertheless observed, in the course of time, some corrosion of such connections.

The present invention proposes to remedy such a drawback and it has as its object a simple and reliable method suitable for providing a sealed connection between alpha alumina and alkaline beta alumina parts, such a connection having, moreover, practically unlimited resistance with respect to liquid alkaline metals at a temperature of up to 300° C.

SUMMARY OF THE INVENTION

The present invention provides a method connecting an alkaline beta alumina part to an alpha alumina part, comprising the following steps:

the disposing alpha alumina part within a pulverulent mass of an alkaline metal compound and heating it to a temperature of between 1400° C and 1600° C for 10 to 20 hours;

allowing the alpha part to cool freely to ambient temperature;

forming a blank of said alkaline beta alumina part;

disposing the alpha and beta parts in contact with each other in a sintering enclosure and establishing, at least in the immediate vicinity of the parts to be joined, an atmosphere rich in alkaline metal during sintering;

heating the sintering enclosure to a temperature of between 1600° C and 1700° C for 30 minutes to 4 hours; and cooling the enclosure freely to ambient temperature. The alkaline metal ion of the alkaline metal compound and consequently the alkaline metal atmosphere should be the same as the alkaline metal of the beta part. For example, if the beta part is beta sodium alumina, the alkaline metal compound would be a sodium compound and the atmosphere would be rich in sodium. Obviously, the same would be true if the alkaline metal were lithium, potassium, etc.

The present invention also provides a device, particularly a sodium-sulphur cell made using the method.

Naturally, it will be understood that devices or equipment other than a sodium-sulphur cell can be made using the method.

Embodiments of the invention are described by way of example with reference to the accompanying drawings.

DESCRIPTION OF PREFERRED EMBODIMENTS

Figure 1:
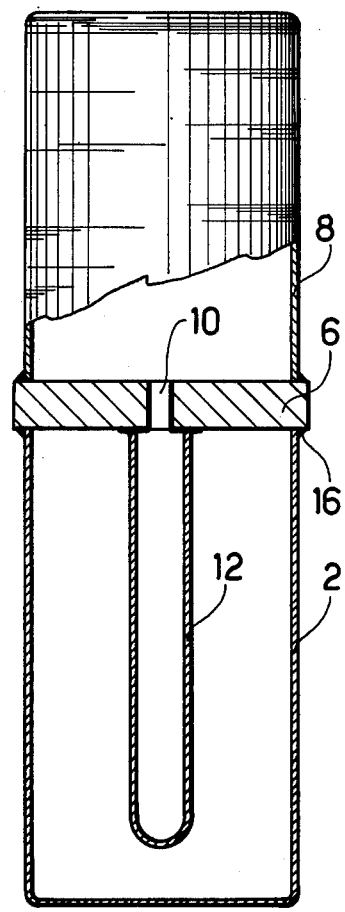
FIG. 1 is a longitudinal partial cross-sectional view of a sodium sulphur electric cell

The electric cell shown in FIG. 1 is in the form of a cylinder of revolution and the figure is a partial cross section view along an axial plane.

The electric cell shown comprises a cylindrical cathode tank 2, made of stainless or steel having a small coefficient of heat expansion.

This tank is lined with a graphite felt (not shown) impregnated with sulphur and acting as a current collector. The wall of the tank 2 is sealed at its upper rim to the lower face of a horizontal, circular alpha alumina plate 6, such sealing being provided by brazing 16.

A cylindrical anode tank 8 having the same diameter as the cathode tank 2, made of the same material, is sealed in the same way by its lower rim to the upper face of the plate 6.

The tank contains a store amount of anode reagent consisting of liquid sodium.

The plate 6 has an axially disposed cylindrical bore 10. The open upper end of a closed cylindrical tube 12, made of beta sodium alumina and containing the anode reagent is disposed concentrically round the bore 10 and is connected to the alpha alumina plate 6 by means of the method according to the invention as described hereinbelow.

With this aim in view, firstly, the alpha alumina disk 6 is disposed in a crucible within a pulverulent mass of sodium carbonate or sodium aluminate. The whole is then heated to a temperature lying between 1400° C and 1600° C for 10 to 20 hours, then cooled freely down to ambient temperature.

During this heat treatment, a thin beta alumina film forms at the surface of the alpha alumina disk 6, due to the diffusion of sodium ions.

A blank of the tube 12 is produced by forming a beta sodium alumina powder by any appropriate conventional technique, but preferably by electrophoresis followed by an isostatic compression of the deposit obtained.

The disk 6 is then inserted in a sintering enclosure and the blank of the tube 12 is positioned so that its open end is disposed concentrically round the bore 10.

Figure 2:
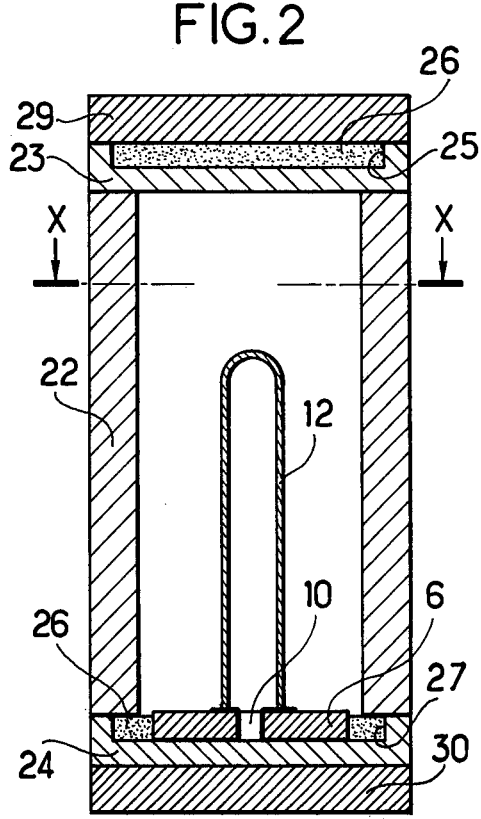
FIG. 2 is a longitudinal cross-sectional view of a first sintering enclosure for implementing the method according to the invention.
Figure 3:
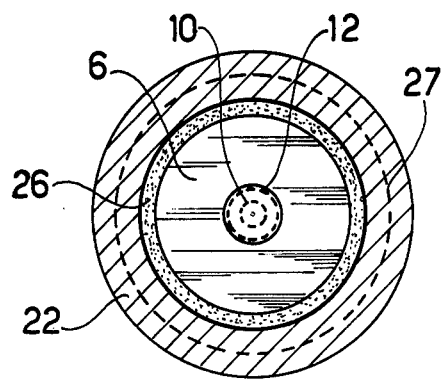
FIG. 3 is a cross-section along the axis XX in FIG. 2.

FIGS. 2 and 3 illustrate the plate 6 and the tube 12 thus disposed in a sintering enclosure such as is described in U.S. patent application Ser. No. 668,998 of Mar. 22, 1976 entitled "A method of preparing alkaline beta alumina parts" and assigned to the common assignee.

This enclosure is made entirely of beta sodium alumina and it comprises a tubular body 22, stopped up at its ends by plates; an upper plate 23 and a lower plate 24.

The upper plate 23 comprises a circular recess 25 in its upper surface lined with sodium carbonate powder or grains 26. Likewise, the lower plate 24 comprises a recess 27 in its upper surface which is also lined in an analogous manner with sodium carbonate powder or grains 26. The assembly is stopped by a cover 29 and rests on a base 30.

The enclosure is inserted in an oven. The temperature is raised to 1650° C and maintained for 1½ hours. The operating conditions may vary however over a duration of 30 minutes to 4 hours, and between temperatures of 1600° C and 1700° C.

The time taken to reach the operating temperature is on the order of 3 hours. Then, the oven is allowed to cool freely. This heat treatment has the combined effects of carrying out the sintering of the tube 12 in the advantageous conditions set forth in our above mentioned patent application and of fixing the tube 12 to the alpha alumina plate 6.

Figure 4:
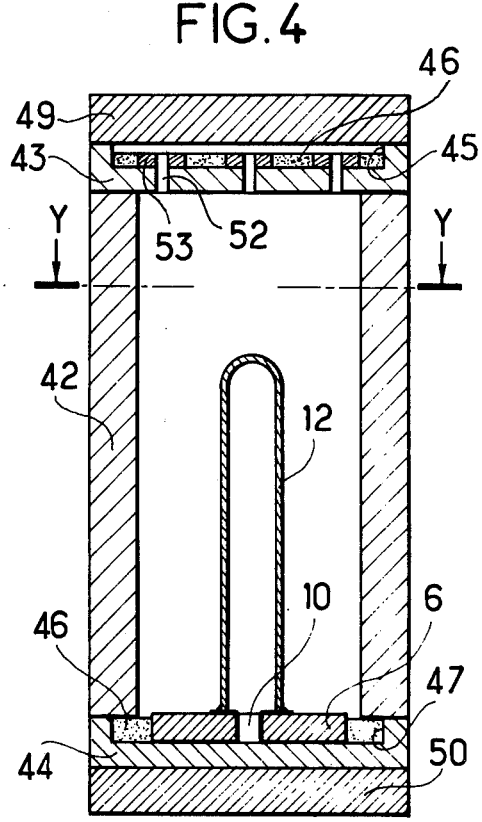
FIG. 4 is a longitudinal cross-sectional view of a second embodiment sintering enclosure for implementing the method according to the invention.
Figure 5:
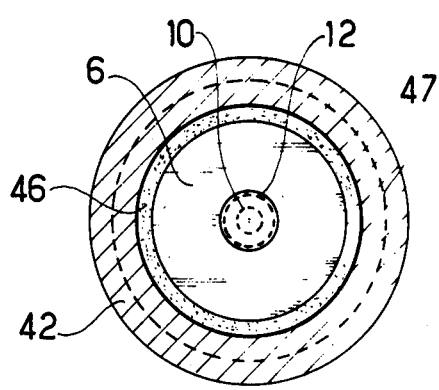
FIG. 5 is a cross-sectional view along the axis YY in FIG. 4.
Figure 6:
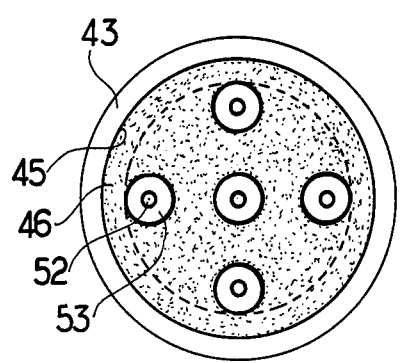
FIG. 6 is a top view of the second sintering enclosure with its cover removed.

FIGS. 4 to 6 show the disk 6 and the blank of the tube 12 inserted in a second sintering enclosure described in our above mentioned patent application.

This second enclosure is made of either alpha alumina or carborundum or zirconium or any other refractory material and it comprises a tubular body 42 stopped at its ends by plates; an upper plate 43 and a lower plate 44. The upper plate 43 comprises a circular recess 45 in its upper surface in which is inserted sodium carbonate powder or grains 46. Likewise, the lower plate 44 comprises a recess 47 in its upper surface lined with sodium carbonate powder or grains 46. The assembly is stopped by a cover 49 and rests on a base 50.

The recess 45 of the upper plate 43 communicates with the interior of the body 42 by means of ducts such as 52. The ducts 52 communicate, moreover, with the recess 45 through upstanding parts 53 intended to prevent the sodium carbonate 46 spread out in the recess 45 from falling into the body 42.

The enclosure is inserted in an oven and its operation is effected as described with reference to FIGS. 2 and 3 with a view to effecting the sintering of the tube 12 and its connection to the plate 6. There then remains to be effected only the removal by abrasion of the beta alumina film thus formed from the parts of the disk 6 not covered by the tube 12.

The connection thus effected is particularly strong and as previously mentioned, its resistance with respect to molten alkaline metals is practically unlimited in time.

Particularly advantageous applications are found for the invention in sodium sulphur cells.

It must be understood that the invention is in no way limited to the embodiment described and illustrated, which has been given only by way of an example.

More particularly, without going beyond the scope of the invention, details can be modified, some arrangements can be changed or some means can be replaced by equivalent means.

In particular as previously mentioned, it is evident that the method according to the invention can be implemented for connecting alkaline beta alumina parts to alpha parts in devices other than sodium sulphur electric cells.

What is claimed is:

1. A method of connecting an alkaline beta alumina part to an alpha alumina part, comprising the steps of:
    disposing said alpha alumina part within a pulverulent mass of an alkaline metal compound;
    heating said alpha alumina part while disposed in said mass to a temperature of between 1400° C and 1600° C for 10 to 20 hours;
    cooling said alpha part freely to ambient temperature;
    forming a blank of said alkaline beta alumina part;
    disposing said alpha and beta parts in contact with each other in a sintering enclosure;
    heating said sintering enclosure to a temperature of between 1600° C and 1700° C for 30 minutes to 40 hours so as to sinter the alkaline beta alumina part and effect a connection thereof to the alpha alumina part;
    establishing during such heating, at least in the immediate vicinity of the parts to be joined, an atmosphere rich in alkaline metal during sintering operation; the alkaline metal ion of the alkaline metal compound and consequently the alkaline metal atmosphere being the same as the alkaline metal of the beta part; and
    cooling the enclosure contents freely to ambient temperature.

2. The method according to claim 1, wherein said sintering enclosure comprises a hollow body, said body being stopped at its ends by means of an upper plate and a lower plate, each of said plates comprising a recess lined with said alkaline metal compound, said lower plate resting on a base, said upper plate being stopped by means of a cover overlying the same, the recess of said upper plate being disposed in the upper part of the upper plate facing said cover and the recess of said lower plate being disposed in the upper part of the lower plate facing said body, and wherein the step of establishing at least in the immediate vicinity of the plate and tube to be joined an atmosphere rich in alkaline metal during sintering operation comprises the heating of the alkaline metal compound within said recesses during the sintering operation.

3. A method according to claim 2, wherein the said sintering enclosure is made of alkaline beta alumina.

4. The method according to claim 1, wherein said sintering enclosure comprises a hollow body, the body being stopped at its ends by means of an upper plate and a lower plate, each of said plates comprising a recess lined with said alkaline metal compound, said lower plate resting on a base, said upper plate being stopped by means of a cover overlying the same, the recess of said upper plate being disposed in the upper part of the upper plate facing said cover, the recess of said lower plate being formed in the upper part of the lower plate facing said body, said recess of the upper plate communicating with the interior of said body by means of ducts formed in said upper plate, said ducts communicating with said recess of the upper plate through upstanding parts positioned within said upper plate recess with said alkaline metal compound being spread out round said upstanding parts, and wherein the step of establishing, at least in the immediate vicinity of the parts to be joined, an atmosphere rich in alkaline metal during sintering operation, comprises the heating of the alkaline metal compound within said recesses during the sintering operation.

5. The method according to claim 4, wherein said enclosure is made of one refractory material from the group consisting of alpha alumina, carborundum and zirconium.

6. The method according to claim 1, wherein the alkaline metal compound is one compound from the group consisting of the carbonates and the aluminates.

7. The method according to claim 1, wherein the steps of forming the beta part is effected by electrophoresis followed by an isostatic compression of the deposit thus obtained.

8. The method according to claim 1, wherein said alkaline beta alumina is beta sodium alumina, said alkaline metal compound comprises a sodium compound, and wherein said atmosphere rich in alkaline metal comprises an atmosphere rich in sodium.

9. In a method of making an electric cell device comprising:
- a circular alpha alumina plate,
- an open ended cylindrical cathode tank sealably coaxial with and mounted at its rim to one face of said circular alpha alumina plate,
- an open ended cylindrical anode tank carrying anode reagent coaxial with and sealably mounted at its rim to the other face of said alpha alumina plate,
- a cylindrical axial bore within said alpha alumina plate, and
- an open ended closed cylindrical tube of alkaline beta alumina containing anode reagent disposed concentrically about said plate axial bore within said cathode tank and connected to said alpha alumina plate;

the improvement wherein:
the connection between said alkaline beta alumina tube to said alpha alumina plate is effected by the method comprising the steps of:
- disposing said alpha alumina plate within a pulverulent mass of an alkaline metal compound,
- heating said alpha alumina plate while disposed in said mass to a temperature of between 1400° C and 1600° C for 10 to 20 hours;
- cooling said alpha alumina plate freely to ambient temperature;
- disposing said alkaline beta alumina tube and alpha alumina plate in contact with each other in a sintering enclosure;
- heating said sintering enclosure to a temperature of between 1600° C and 1700° C for 30 minutes to 4 hours so as to sinter the alkaline beta alumina part and effect the connection thereof to the alpha alumina plate;
- establishing, during such heating, at least in the immediate vicinity of the plate and tube to be joined, an atmosphere rich in alkaline metal; the alkaline metal ion of the alkaline metal compound and consequently the alkaline metal atmosphere being the same as the alkaline metal of the beta part; and
- cooling the enclosure contents freely to ambient temperature.

* * * * *